United States Patent [19]

Bauer et al.

[11] 4,412,768
[45] Nov. 1, 1983

[54] TRUCK BUMPER INCORPORATING HAY HANDLING DEVICE

[76] Inventors: Michael J. Bauer, R.R. #1; Alphonse H. Bauer, P.O. Box 13, both of Freeburg, Mo. 65035

[21] Appl. No.: 457,023

[22] Filed: Jan. 10, 1983

[51] Int. Cl.³ .............................................. B66F 9/065
[52] U.S. Cl. .................................. 414/24.5; 414/551
[58] Field of Search ...................... 414/24.5, 546, 551, 414/554, 556, 557, 685, 722, 723, 785, 911, 912; 293/44, 117

[56] References Cited

U.S. PATENT DOCUMENTS

| | | | |
|---|---|---|---|
| 3,625,380 | 12/1971 | Anderson | 414/546 |
| 3,921,837 | 11/1975 | Vandewater | 414/912 X |
| 4,056,205 | 11/1977 | Etzler | 414/722 |
| 4,090,624 | 5/1978 | Krein . | |
| 4,099,629 | 7/1978 | Cox | 414/24.5 |
| 4,179,034 | 12/1979 | Van Antwerp et al. | 414/551 |
| 4,305,694 | 12/1981 | Chan . | |

FOREIGN PATENT DOCUMENTS 121302 3/1948 Sweden ............................ 414/546

OTHER PUBLICATIONS

Gold'n Spike Bale Carriers, Gold'n Industries.

*Primary Examiner*—Robert J. Spar
*Assistant Examiner*—Ken Muncy
*Attorney, Agent, or Firm*—Kokjer, Kircher, Bradley, Wharton, Bowman & Johnson

[57] ABSTRACT

A hydraulically powered unit which serves as a rear truck bumper and as a bale carrier for large cylindrical hay bales. The unit includes a pair of stationary end bumper sections and a pivotal center bumper section having a pair of sockets for receiving bale piercing spears. A rigid frame secures the bumper to the truck at the customary location for the rear bumper. The center bumper section can be pivoted by hydraulic cylinders in order to load an impaled bale into the truck bed for transport and to unload the bale back onto the ground. Spring loaded locking plates hold the spears in the sockets and can be released to permit removal of the spears when they are not needed to handle bales.

20 Claims, 5 Drawing Figures

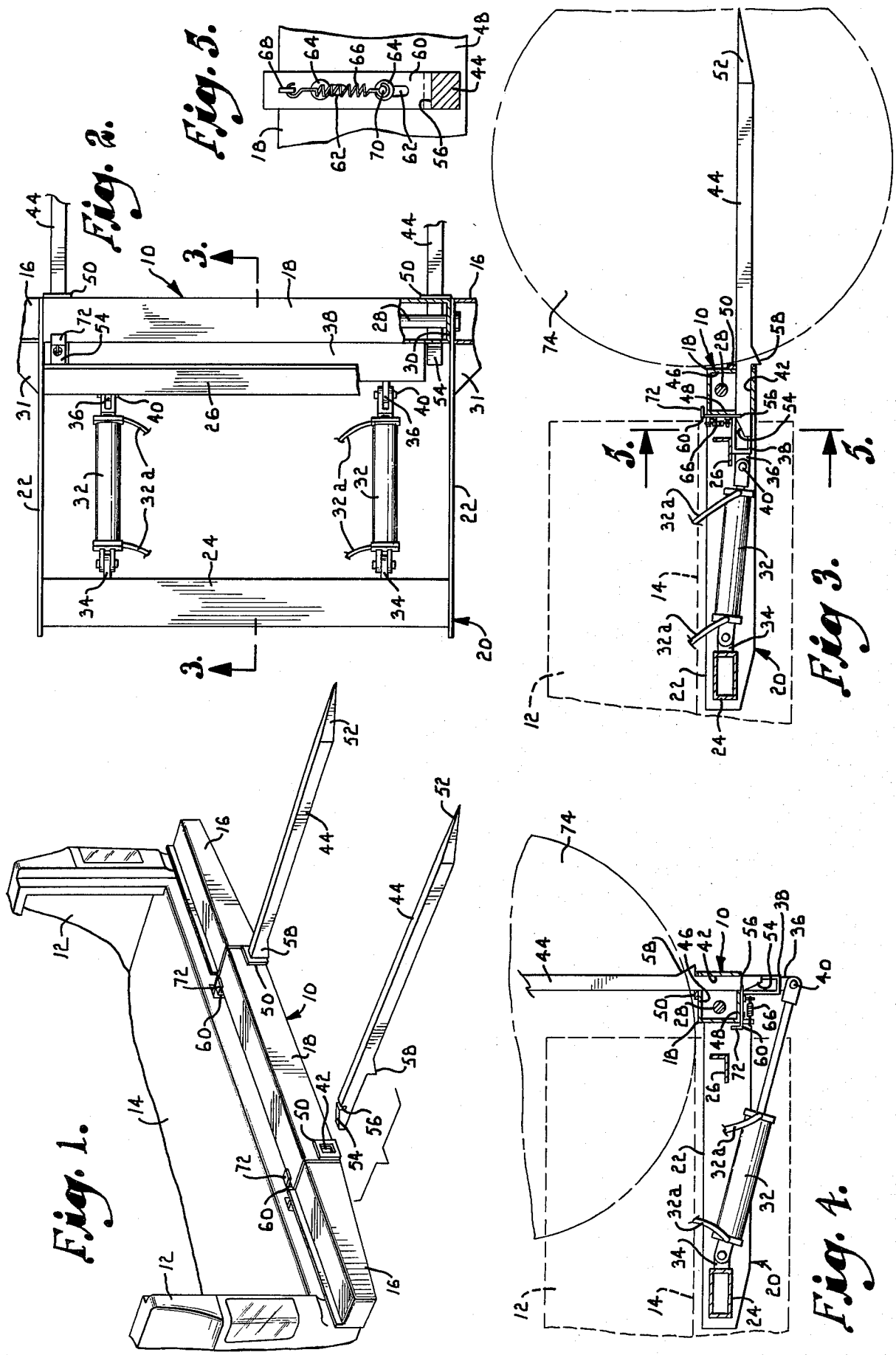

TRUCK BUMPER INCORPORATING HAY HANDLING DEVICE

BACKGROUND AND SUMMARY OF THE INVENTION

This invention relates generally to the handling of hay bales and more particularly to a truck bumper which is constructed to load large round hay bales into a truck bed and unload the bales therefrom.

In recent years, it has been popular for hay to be baled in large cylindrical bales which in some cases can weigh thousands of pounds. Needless to say, the advent of hay bales this size has led to a need for equipment capable of properly handling the bales. Most of the equipment that has been proposed in the past is either self-contained or is constructed for use with a tractor.

In addition, devices have been proposed for attachment to a pickup truck to permit the truck to carry large hay bales, as shown in U.S. Pat. No. 4,090,624 to Krein et al, for example. However, devices of this type have been lacking in a number of respects. The main disadvantage is that the added equipment and accessories take up so much room in the truck bed that it is not fully available for the handling of normal loads. Also, the devices that have been proposed in the past for use with trucks are overly complex and expensive. The bale carrier shown in the Krein et al patent requires lost motion mechanisms and other complicated mechanical components which lead to high cost and reliability problems.

The present invention is directed to an improved hay handling device which functions both as a rear truck bumper and as a bale carrier for loading large cylindrical hay bales into the truck bed for transport. In accordance with the invention, the rear truck bumper is formed by two stationary end sections and a pivotal center section. The bumper is carried on a rigid frame which can be bolted or otherwise secured to the truck frame to mount the bumper at the customary rear bumper location. The center section of the bumper is provided with a pair of sockets which receive spears having pointed tips for piercing the hay bale when the truck is backed toward it. Spring loaded locking plates secure the spears in the sockets and yet can be easily released to permit removal of the spears. A pair of hydraulic cylinders powered by the power steering pump of the truck pivot the center bumper section upwardly to raise the impaled bale into the truck bed. The bale can be unloaded simply by retracting the cylinders to pivot the center section of the bumper in a direction to lower the bale to the ground. When the bale handling capability of the truck is not needed, the spears can be removed and the entire truck bed is then available for normal use.

It is an important object of the invention to provide a bale handling device for a pickup truck which does not significantly alter the truck bed or otherwise interfere with the load handling capability of the truck. Unlike the devices that have been proposed in the past, the bumper of the present invention maintains the truck bed fully available for use to handle ordinary loads.

Another important object of the invention is to provide a bale handling device which acts as a rear bumper when not used to handle hay bales.

Still another object of the invention is to provide a hay handling device of the character described which is simple and economical to construct and easy to install on pickup trucks of various styles.

A further object of the invention is to provide a bale handling device of the character described in which removable spears are used for impaling the bales. An equally important feature of the invention is the arrangement by which the spears can be quickly and easily applied to and removed from the bumper. Spring loaded lock plates on the bumper securely lock the spears in their sockets and yet can be easily released to permit detachment of the spears. Also significant is the beveled surface on each spear which assures that the spear will automatically lock in place when it is fully inserted in its socket.

An additional object of the invention is to provide a bale handling device of the character described which uses the existing hydraulic system of the truck for power to load and unload the bales.

Yet another object of the invention is to provide a bale handling device of the character described which can be operated from the truck cab simply by pushing a button.

A still further object of the invention is to provide a bale handling device of the character described which is strong enough to handle even the largest and heaviest hay bales that are normally encountered.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views:

FIG. 1 is a fragmentary perspective view showing a pickup truck equipped with a hay handling bumper device constructed according to a preferred embodiment of the present invention, with one of the spears removed from its socket;

FIG. 2 is a fragmentary top plan view of the hay handling bumper device, with portions broken away for purposes of illustration;

FIG. 3 is a sectional view taken generally along line 3—3 of FIG. 2 in the direction of the arrows and showing a large cylindrical hay bale impaled by the spears of the device;

FIG. 4 is a sectional view similar to FIG. 3 but showing the hay bale loaded into the truck bed; and FIG. 5 is a fragmentary view on an enlarged scale taken generally along line 5—5 of FIG. 3 in the direction of the arrows.

Referring now to the drawing in more detail and initially to FIG. 1, the present invention provides a bumper, generally designated by numeral 10, which serves as the rear bumper of a pickup type truck having a load carrying bed defined between opposite side walls 12 and above a floor 14 of the bed. A tailgate (not shown) is normally included behind the truck bed. The bumper 10 is formed by opposite end bumper sections 16 and a center bumper section 18 which extends between the end sections 16. The center section 18 of the bumper takes the form of a square tube, while the end sections 16 taper somewhat toward their outer ends.

With additional reference to FIG. 2 in particular, the bumper 10 is mounted on the truck by means of a rigid frame generally designated by numeral 20. The frame 20 includes opposite side plates 22 which are parallel to one another. A rectangular beam 24 extends between the forward ends of the side plates 22 and is welded or otherwise secured thereto. The opposite or back ends of the side plates 22 are located adjacent to the opposite ends of the center bumper section 18 and are fitted between the center section 18 and the opposite end sections 16 of the bumper. The frame further includes a cross brace 26 formed by an angle which extends between the side plates 22 slightly forwardly of their back ends. The cross brace 26 is parallel to beam 24 and to the bumper 10.

With continued reference to FIG. 2 in particular, the center bumper section 18 is mounted to pivot about a horizontal shaft 28 which extends within bumper section 18 between the opposite side plates 22. Shaft 28 extends through end plates 30 which cover the opposite ends of the center bumper section 18. The shaft extends loosely through the end plates such that bumper section 18 can pivot about the horizontal axis defined by the shaft. The opposite ends of shaft 28 extend through and are secured to the opposite side plates 22. The end bumper sections 16 are welded or otherwise secured to the side plates 22 to form continuations of the center bumper section 18 on its opposite ends. Gusset plates 31 reinforce the connections between bumper sections 16 and the side plates 22.

The center bumper section 18 is turned about shaft 28 by a pair of hydraulic cylinders 32 which are pivoted at their base ends to lugs 34 projecting from beam 24. The opposite or rod ends of the cylinders 32 are pivoted to lugs 36 projecting from a rectangular beam 38. The beam 38 extends from the center bumper section 18. The pivot pins 40 which secure the rod ends of the cylinders to lugs 36 are parallel to and offset from shaft 28.

When the cylinder rods are fully retracted as shown in FIG. 3, the center bumper section 18 is in the normal position wherein it cooperates with the end bumper sections 16 to form the rear bumper of the truck. Extension of the cylinders 32 pivots bumper section 18 through an arc of 90° to the bale carrying position shown in FIG. 4. The lower flange of the cross brace 26 forms a stop which contacts beam 38 to prevent the center bumper section 18 from pivoting beyond the normal position of FIG. 3. Cylinders 32 are equipped with hoses 32a which connect with the hydraulic system of the truck. The power steering pump of the truck applies pressurized fluid to the cylinder. A push button or other control in the cab of the truck controls the hydraulic cylinders 32.

The center bumper section 18 is provided with a pair of square sockets 42 which receive removable spears 44 used to impale hay bales. The sockets 42 are located near the opposite ends of bumper section 18. As best shown in FIG. 3, each socket 44 extend through the back wall 46 and the front wall 48 of bumper section 18. A reinforcing strip or boss 50 extends around each socket 42 adjacent the front wall 46 of bumper section 18.

The spears 44 are square in section and closely fit through the sockets 42. Each spear 44 has a sharply pointed tip 52 on its back end for impaling hay bales. The opposite or front end of each spear 44 has an inclined top surface 54 which is beveled to act in the manner of a cam, as will be explained more fully. Immediately behind each beveled surface 54, each spear 44 is provided with a notch 56. Spaced rearwardly from the notch 56 of each spear is a projection 58 located on the bottom of the spear. Each projection 56 has a flat surface which faces forwardly and engages the reinforcing strip 50 when the spear is fully inserted in its socket 42.

The spears 44 are releasably locked in sockets 42 by a pair of locking plates 60 mounted adjacent to the sockets on the front wall 48 of the center bumper section 18. The locking plates 60 fit closely in notches 56 in order to lock the spears in place.

With particular reference now to FIG. 5, each locking plate 60 is provided with a pair of slots 62 through which a pair of studs 64 extend. The studs 64 are secured to wall 48. Each stud 64 has an enlarged head which has a width greater than that of slot 62 in order to hold plate 60 against wall 48. Each plate 60 can slide up and down on wall 48 within the limits defined when studs 64 engage opposite ends of slots 62.

Each plate 60 is continuously urged downwardly toward the position shown in FIG. 5 by a tension spring 66 hooked at its top end to a lug 68 projecting from plate 60. The bottom end of spring 66 is hooked to a pin 70 projecting from the lower stud 74. Springs 66 urge locking plates 60 downwardly to the locking positions wherein the locking plates fit within notches 56 to lock the spears in place in extension through the sockets 42. Each locking plate 60 has a rearwardly turned tab 72 on its top end which provides a finger grip for pulling the locking plate upwardly to the release position in which it is withdrawn from notch 56 in order to release the spear 44 and permit its withdrawal from socket 42.

Installation of bumper 10 is carried out by inserting the frame 20 of the bumper beneath the truck bed floor 14 and bolting or otherwise securing frame 20 to the frame of the truck in order to mount the bumper 10 in the customary rear bumper position, as shown in FIG. 1. The hoses 32a are connected with the existing hydraulic circuit supplied by the power steering pump of the truck. A control button located within the cab of the truck controls the application of fluid to the cylinders 32 in order to control their extension and retraction, as indicated previously.

In normal use of the truck, bumper 10 functions as the rear bumper of the truck. The hydraulic cylinders 32 are fully retracted to maintain the center bumper section 18 in the normal position shown in FIGS. 1 and 3. The spears 44 are removed from sockets 42. In the normal position of the center bumper section, it cooperates with the end bumper sections 16 to provide the rear bumper of the truck. It is noted that the bumper 10 does not occupy any space within the truck bed so that the truck bed remains fully available for handling normal loads.

When a large cylindrical hay bale such as the bale 74 shown in FIGS. 3 and 4 is to be loaded, the spears 44 are inserted in sockets 42. As each spear is being inserted in its socket, beveled surface 54 contacts the lower end portion of the locking plate 60 and, by camming action, pushes the locking plate upwardly away from the locking position and toward the release position. When the spear has been fully inserted in the socket, projection 58 contacts the reinforcing strip 50, and the notch 56 is then located in registration with the locking plate 60. At this time, spring 66 returns the locking plate 60 to the locking position wherein it fits closely in the notch 56. The spear 44 is thereafter securely held in the socket 42 with projection 58 engaging one side of the bumper and notch 56 and plate 60 located adjacent the opposite side of the bumper.

When both spears 44 have been installed, they project rearwardly from the center bumper section 18 and are oriented horizontally with their sharp tips 52 pointing to the rear. The truck is then backed toward the bale 74 which at this time is resting on the ground. The bale is pierced by the sharp tips 52, and the spears are progressively driven into the bale until it is fully impaled in the position shown in FIG. 3.

Cylinders 32 are then extended to pivot the center bumper section 18 upwardly to the bale carrying position shown in FIG. 4 wherein the spears are oriented vertically. The spears 44 lift the bale upwardly and load it into the truck bed in the position shown in FIG. 4. The truck can then be driven off to transport the bale to the desired location. During transport, the spears 44 remain impaled in the hay bale to maintain it in a stationary position.

When the bale is to be unloaded, cylinders 32 are retracted to pivot the center bumper section 18 from the bale carrying position of FIG. 4 to the normal position of FIG. 3. The spears 44 lower bale 74 onto the ground, and the truck can then simply be driven forwardly to withdraw the spears from the bale.

When the spears are not needed for handling hay, they are removed by pulling upwardly on the tab 72 of each locking plate in order to withdraw the locking plate from notch 56. This releases the spear 44 so that it can be pulled out of its socket 42. When the tab 72 is thereafter released, spring 66 returns the locking plate 60 to the locking position so that it will automatically lock the spear in place when it is again inserted into socket 42.

The sturdy frame 20 maintains bumper 10 in position to function as the rear bumper of the truck. At the same time, the frame 20 provides sufficient strength to permit the bumper to handle hay bales weighing up to 3000 pounds. The hydraulic cylinders 42 provide lifting power of 3000 pounds to permit even the largest bales to be loaded into and unloaded from the truck bed.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. A bale carrying device for attachment to a truck, said device comprising:
   a rear bumper;
   a frame carrying said rear bumper thereon, said frame being adapted for attachment to the truck to mount said bumper thereon in the customary rear bumper position;
   means for connecting said bumper with said frame in a manner permitting the bumper to pivot about a generally horizontal axis between a normal position and a bale carrying position, said bumper being constructed to function in the manner of a customary rear truck bumper in the normal position;
   power means for readily effecting pivotal movement of said bumper between the normal and bale carrying positions; said power means and said frame being located beneath a load bed of the truck in a noninterfering position to permit free access to the load bed;
   a pair of spears each having a sharp tip for piercing a hay bale; and
   means for removably connecting said spears with said bumper at spaced apart locations to project generally horizontally therefrom to the rear in the normal position of the bumper for impaling the bale, said spears extending generally vertically above the bumper in the bale carrying position,
   whereby the truck can be backed toward the bale with said bumper in the normal position to drive said spears into the bale and said power means can be operated to move the bumper to the bale carrying position to raise the bale for transport.

2. A device as set forth in claim 1, wherein said connecting means comprises:
   a pair of sockets in said bumper for receiving said spears; and
   releasable means for locking said spears in the sockets.

3. A device as set forth in claim 2, wherein said releasable means acts automatically to lock said spears in the sockets upon insertion therein.

4. A device as set forth in claim 2, wherein said releasable means comprises:
   a notch in each spear;
   a pair of lock members mounted on said bumper adjacent the sockets for movement between locking and release positions wherein said lock members are respectively engaged in and removed from the notches in the spears; and
   yieldable means for urging each lock member toward the locking position thereof.

5. A device as set forth in claim 4, wherein:
   said bumper includes opposite surfaces;
   said lock members are mounted adjacent one surface of the bumper; and
   each spear has a projection presenting a surface which engages the opposite bumper surface when the lock member is engaged in the notch adjacent said one surface of the bumper, whereby the spears are rigidly locked in the sockets.

6. A device as set forth in claim 4, including a beveled surface on each spear acting against the corresponding lock member in camming fashion to move the lock member from the locking to the release position as the spear is being inserted into the socket, said yieldable means returning to the lock member to the lock position when the spear is fully inserted into the socket to register the notch in the spear with the lock member.

7. A device as set forth in claim 1, wherein said power means comprises hydraulic cylinder means powered by hydraulic fluid from the hydraulic system of the truck.

8. A device as set forth in claim 1, wherein said frame includes:
   a beam;
   a pair of generally parallel side plates having rear ends carrying said bumper and front ends between which said beam extends; and
   a cross brace extending between said side plates at a location intermediate said front and rear ends thereof.

9. A device as set forth in claim 8, wherein said power means comprises a pair of power cylinders each connected at one end with said beam and at the other end with said bumper at a location offset from said axis, whereby extension and retraction of the cylinders pivots said bumper about said axis between the normal and bale carrying positions.

10. A bale carrying bumper structure for a truck, said bumper structure comprising:
   a rear bumper;
   frame means for mounting said bumper on the truck in the customary rear bumper position for pivotal movement about a generally horizontal axis between a normal position and a bale carrying position, said rear bumper functioning as a customary rear truck bumper in the normal position and as a bale carrier in the bale carrying position;
   power means for pivoting said bumper between the normal and bale carrying positions; said power means and said frame being located beneath a load bed of the truck in a noninterfering position to permit free access to the load bed;
   a pair of spears each having a sharp tip for piercing a hay bale;
   a pair of sockets in said bumper at spaced apart locations for receiving said spears, said sockets orienting said spears generally horizontally in rearward projection from the bumper to impale a bale toward which the truck is backed with said bumper in the normal position, said spears extending generally upwardly from the bumper in the bale carrying position to raise the impaled bale to a transport position; and
   releasable means for securing said spears in said sockets.

11. The invention of claim 10, wherein said releasable means comprises:
   a notch in each spear; and
   a pair of lock members for entering the notches in the spears to lock the spears in the sockets, said lock members being mounted on the bumper adjacent the sockets for sliding movement between a locking position in the notch and a release position displaced from the notch to permit detachment of the spear from the bumper.

12. The invention of claim 11, including spring means for urging each lock member toward the locking position.

13. The invention of claim 12, including a beveled surface on each spear engageable with the corresponding lock member to move the same to the release position during entry of the spear into the socket, said lock members each returning to the locking position under the influence of said spring means when the spear has been fully inserted into the socket to register the notch in the spear with the lock member.

14. The invention of claim 10, wherein:
   said frame means includes a rigid frame adapted for attachment to the truck to mount said bumper thereon; and
   said power means includes a pair of power cylinders each connected at one end with said frame and at the other end with said bumper at a location offset from said axis to pivot the bumper about said axis in response to extension and retraction of said cylinders.

15. The invention of claim 14, including stop means for preventing said bumper from moving past the normal position.

16. A bale carrying bumper structure for attachment to a truck, said bumper structure comprising:
   a pair of spaced apart end bumper sections;
   a center bumper section extending between said end bumper sections;
   a frame adapted for attachment to the truck to mount said end and center bumper sections thereon at the customary location of the rear bumper;
   a generally horizontal shaft extending between said end bumper sections, said center bumper section being mounted on said shaft for pivotal movement thereon between a normal position wherein the end and center bumper sections cooperate to form a rear bumper for the truck, and a bale carrying position for transporting a hay bale;
   a pair of spears each having a sharp tip for piercing the bale;
   a pair of spaced apart sockets in said center bumper section for receiving said spears in a manner to locate same in rearward projection from the center bumper section to impale the bale in the normal position of the center section when the truck is backed toward the bale, and in upward projection from the center bumper section to raise the bale for transport on the truck in the bale carrying position of the center bumper section; and
   power means for pivoting said center bumper section about said shaft between the normal and bale carrying positions; said power means and said frame being located beneath a load bed of the truck in a noninterfering position to permit free access to the load bed.

17. The invention of claim 16, including releasable lock means acting to lock said spears in said sockets automatically in response to insertion of the spears in the sockets.

18. The invention of claim 16, including:
   a notch in each spear;
   a lock member for each spear, said lock members being mounted on the center bumper section for movement between a locking position wherein the lock members are engaged in the notches of the spears to lock same in the sockets, and a release position wherein the lock members are withdrawn from said notches to permit removal of the spears from the sockets; and yieldable spring means for urging each lock member toward the locking position.

19. The invention of claim 18, including a beveled surface on each spear interacting with the corresponding lock member to move same to the release position as the spear is being inserted into the socket, said spring means acting to return each lock member to the locking position when the spear is fully inserted in the socket.

20. The invention of claim 16, wherein said power means includes extensible and retractible power cylinder means having one end connected to said frame and an opposite end connected with said center bumper section at a location offset from said shaft.

* * * * *